United States Patent [19]
Horng

[11] Patent Number: 4,680,835
[45] Date of Patent: Jul. 21, 1987

[54] SPORT SHOE LACING DEVICE

[76] Inventor: Sheng-Chorng Horng, No. 590-2, Chung Cheng Road, Tsao Tun Chen, Nan Tou, Taiwan

[21] Appl. No.: 857,342

[22] Filed: Apr. 30, 1986

[51] Int. Cl.[4] .............................................. A43C 7/00
[52] U.S. Cl. .................................... 24/117; 24/136 R
[58] Field of Search ............ 403/211, 374; 24/115 H, 24/115 G, 115 M, 136 K, 136 R, 136 L, 117 R, 121

[56] References Cited

U.S. PATENT DOCUMENTS

| | | | |
|---|---|---|---|
| 1,481,903 | 1/1924 | Hart | 24/117 R |
| 2,236,506 | 4/1941 | Hirsch | 24/115 G |
| 3,138,839 | 6/1964 | Mathes | 24/117 R |
| 3,897,161 | 7/1975 | Reinwall, Jr. | 403/211 |
| 4,102,019 | 7/1978 | Boden | 24/117 |
| 4,156,574 | 5/1979 | Boden | 24/115 M X |
| 4,336,636 | 6/1982 | Ishiguro et al. | 24/117 X |
| 4,393,550 | 7/1983 | Yang et al. | 24/117 |

FOREIGN PATENT DOCUMENTS

| | | | |
|---|---|---|---|
| 202071 | 5/1965 | Sweden | 24/115 M |
| 201319 | 8/1923 | United Kingdom | 24/136 R |
| 2066891 | 7/1981 | United Kingdom | 24/117 |

Primary Examiner—Kenneth J. Dorner
Assistant Examiner—James R. Brittain
Attorney, Agent, or Firm—Stoll, Wilkie, Previto & Hoffman

[57] ABSTRACT

A lacing device in which the adjusting and maintaining of the vamp can be conveniently achieved. The device is slidably attached at an appropriate position to a lace such that it can be moved upward or downward as desired.

3 Claims, 6 Drawing Figures

SPORT SHOE LACING DEVICE

BACKGROUND OF THE INVENTION

This invention relates to a lacing device for sport shoes in which the vamp section can be optionally adjusted and maintained to fit almost any foot size.

Most sport shoes are equipped with conventional laces, but it has been found to be inconvenient to use laces for all types of sport shoes. For instance, the laces may easily loosen and become tangled during rigorous exercise, cuasing the wearer to trip.

SUMMARY OF THE PRESENT INVENTION

An object of the present invention is to provide a lacing device for shoes which allows the wearer to effectively adjust the fit of vamp of the shoes.

Another object of the present invention is to provide a lacing device for shoes which is simple and economical to manufacture.

A further object of the present invention is to provide a lacing device for shoes which allow the wearer to conveniently take off or put on his shoe.

Other objects and advantges of the invention will become apparent from a study of the following specification in conjunction with the accompanying drawings.

BRIEF DESCRIPTION OF THE DRAWINGS

FIG. 4 is a sectional view of the lacing device which illustrates the position of lace within the device when Y-shaped piece is pushed in;

DETAILED DESCRIPTION OF THE PREFERRED EMBODIMENT

Figure 1:
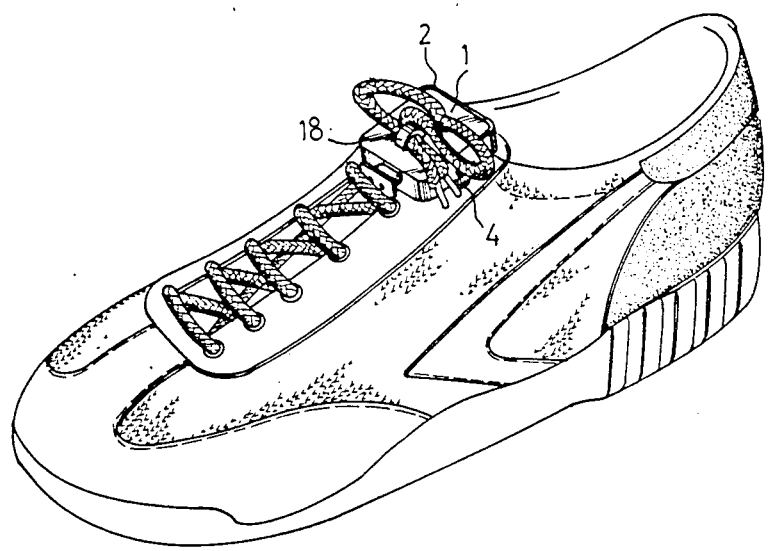
FIG. 1 is a perspective view of a sport shoe incorporating the lacing device of the present invention and illustrating the vamp section secured.
Figure 2:
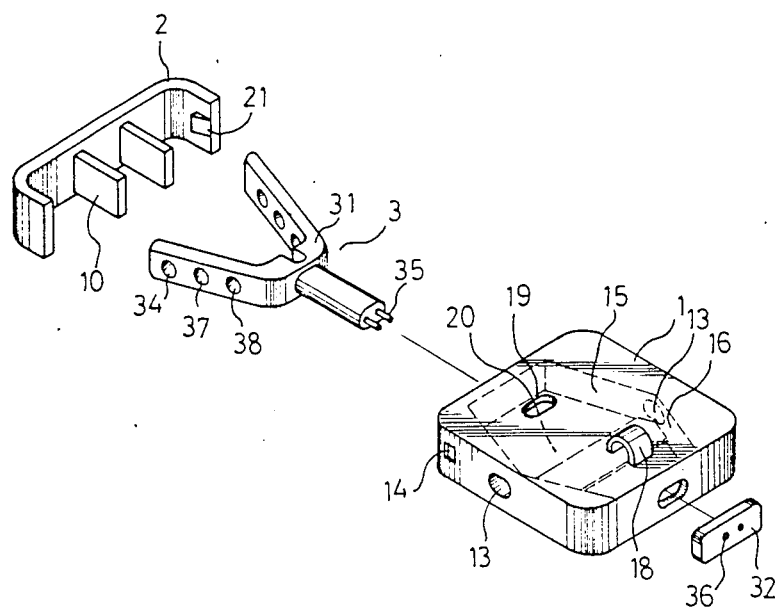
FIG. 2 is a fragmentary view of the lacing device.

Referring FIG. 1 can be seen that the lacing device comprises a housing (1), fastening element (2) and a Y-shaped piece (3). Within the housing (1) is a hollow space (20) in which the rear face of said housing (1) is provided with a notch (11) (not shown). The front face and the two side faces of the housing (1) each are designed with an oval-shaped aperture (13) which extend to the hollow space (20). The hollow space (20) in the center of the housing (1) has a hexagonal shape and forms two rear and two front inclined edges (15) and (16) respectively. On the surfaces of the front inclined edges (16) have treads (see FIG. 3) which increase the friction between the lace (4) and said surface of the rear inclined edges (16). The top surface of the housing (1) has a fastening seat (18) which fastens the lace (4). There is also an oval-shaped aperture (19) on the surface through which the laces (4) fitted.

Figure 6:
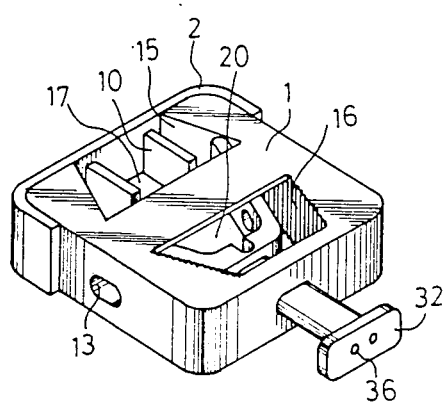
FIG. 6 is a perspective view of the present invention which shows the bottom surface of lacing device in detail.

The fastening element (2) is arch-shaped, in which each inner surface of both ends of the fastening element (2) is designed with a hook (21), which fits into the square hole (14) at the rear end of either side face of the housing (1), and thus fit into the notch (11) of the lacing device. There are two parallel plates (10) (See FIG. 6) which extend from the central portion of the arch-shaped fastening element (2), which prevent the tips (31) of the Y-shaped piece (3) from clamping to each other.

The Y-shaped piece (3) comprises two flexible tips (31) and a horizontal plate (32). The Y-shaped piece (3) is formed by injection moulding with FRP material having excellent elasticity. Along the tips (31) of the Y-shaped piece (3), a plurality of holes (34), (37) and (38) are provided, which the lace passes through. Two tiny protrusions (35) are provided at the base of the Y-shaped piece (3) such that a plate (32) with apertures (36) can be exactly secured to said tiny protrusions (35).

Figure 3:
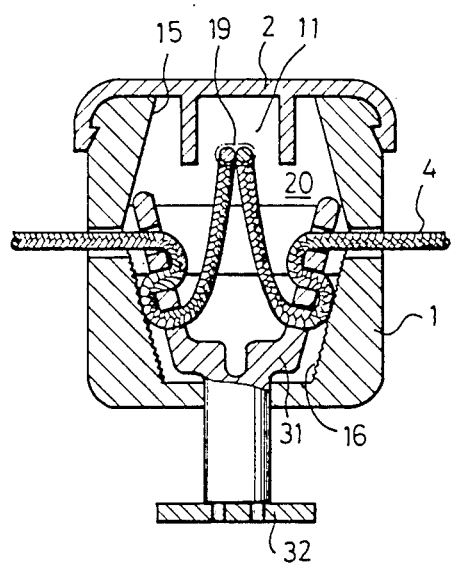
FIG. 3 is a sectional view of the lacing device which illustrates the position of lace within the device when Y-shaped piece is pulled out.
Figure 4:
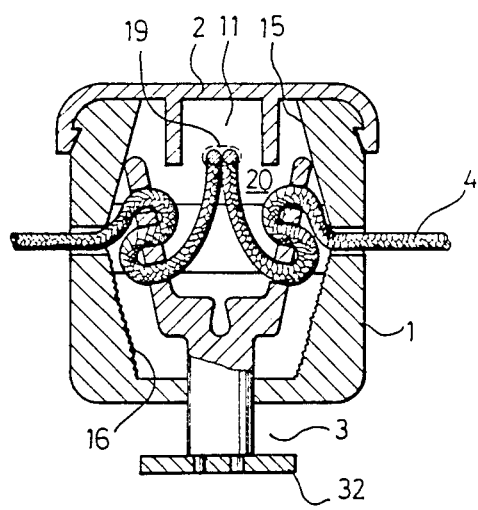
Figure 5:
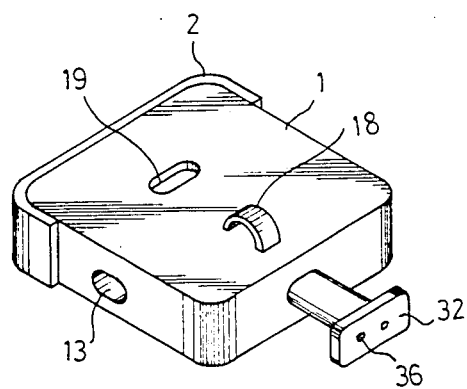
FIG. 5 is a perspective view of the present invention which shows the top surface of lacing device in detail.

Referring to FIG. 3 and FIG. 4, the combination of lace (4) with the lacing device of the present invention can be seen. The lace (4) passes first through the holes on the vamp and one end of the shoelace (4) passes through the oval-shaped aperture (13) of the housing (1). Next, the lace (4) passes through the holes (34) and (37), (38) which are shown in the drawings respectively. After this process is completed, both ends of the shoelace (4) are fastened on to the fastening seat (18) via the aperture (19). The procedure of lacing the shoelace into said Y-shaped piece (3) or through the housing (1) should be completed before the shoe is sold in the market.

The following few paragraphs describe how to adjust the laces using the present invention so that the shoes fit comfortably. It will be assumed that the vamp section has been laced and the lacing device appropriately attached to the lace (4).

Referring to FIG. 4, the procedure for loosening the lace can be understood. Firstly, the Y-shaped piece (3) is pushed in by pressing the plate (32) which causes the tips (31) (not labelled) of said element (3) to be diverted inwardly due to the surface of edge (15). Secondly, the lacing device is pulled upward with the Y-shaped piece (3) remaining in a pressed position, that is, the lacing device is slidably moved upwardly along the lace (4). Thus the lacing device apart from the shoes to space a suitable length, the vamp of lace is loosened and the wearer can then remove his foot from the shoe.

Referring to FIG. 3, the procedure for the tightening of vamp section can be understood. Firstly, the end section of lace (4) is pulled tightly after lace (4) emerged from aperture (38) of the Y-shaped piece (3) and then the Y-shaped piece (3) is pushed inwardly along the housing (1) while the lacing device is slidably moved downward to the vamp such that any slack can be taken up, the extreme of lace (4) is fitted at fastening seat (18). The Y-shaped piece (3) is released when the shoelace (4) is tight enough. Due to the friction between the shoelace (4) and the tread on the surface of inclined edge (16), the lace is thus clamped tightly and the vamp will always fit appropriately.

While herein a particular embodiment has been shown and described, it will be obvious to those skilled in the art that changes and modifications may be made without departing from the spirit of the invention, and that it is intended by the appended claims to cover all such modifications as fall within the scope of the invention.

I claim:

1. A shoelace lacing device comprising a housing having a central hollow space contained within a rear face, front face, top face and side faces of said housing, a notch being on the rear face of housing, the front face of said housing and side faces of said housing each being provided with an oval-shaped hole, a square hole being provided at a rear end of each side face of said housing, said central hollow space being hexagonally-shaped so as to form front and rear inclined edges, respectively, the surfaces of said front inclined edges being treaded, the top face of said housing having a fastening seat and a oval-shaped hole to clamp the shoelace;

a fastener body which is a bow-shaped element with two ends and an inner surface, one hook being at the inner surface of each end of the fastener such that each hook is exactly fixed to each of said square holes of the housing, and two parallel plates extending into the central region of the fastener body;

a Y-shaped piece comprising a base and extending from said base are elastic tips having holes along the surface of tips for the passage of lace, tiny protrusions extending from the base of the Y-shaped element such that said tiny protrusions can be engaged with a horizontal plate for pressing said Y-shaped pieces.

2. A shoe lacing device as set forth in claim 1, wherein the Y-shaped element presses the shoe lace against the tread on the surface of inclined edge.

3. A shoe lacing device as set forth in claim 1, wherein the Y-shaped element is an elastic structure such that the tips of said Y-shaped element are flexible.

* * * * *